US009705617B2

(12) United States Patent
Alibakhsh et al.

(10) Patent No.: US 9,705,617 B2
(45) Date of Patent: Jul. 11, 2017

(54) SYSTEM AND METHOD FOR WIRELESSLY TRANSMITTING AND RECEIVING CUSTOMIZED DATA BROADCASTS

(71) Applicants: Massoud Alibakhsh, Atlanta, GA (US); Shahram Famorzadeh, Marietta, GA (US)

(72) Inventors: Massoud Alibakhsh, Atlanta, GA (US); Shahram Famorzadeh, Marietta, GA (US)

( * ) Notice: Subject to any disclaimer, the term of this patent is extended or adjusted under 35 U.S.C. 154(b) by 145 days.

(21) Appl. No.: 14/181,346

(22) Filed: Feb. 14, 2014

(65) Prior Publication Data
US 2015/0046560 A1    Feb. 12, 2015

Related U.S. Application Data

(60) Provisional application No. 61/863,819, filed on Aug. 8, 2013.

(51) Int. Cl.
*H04L 29/06*    (2006.01)
*H04H 20/71*    (2008.01)
(Continued)

(52) U.S. Cl.
CPC ............ *H04H 20/71* (2013.01); *H04H 20/61* (2013.01); *H04H 60/14* (2013.01); *H04L 63/08* (2013.01);
(Continued)

(58) Field of Classification Search
None
See application file for complete search history.

(56) References Cited

U.S. PATENT DOCUMENTS 5,758,257 A * 5/1998 Herz ................... G06Q 20/383
                                                    348/E7.056
5,893,067 A    4/1999 Bender et al.
(Continued)

FOREIGN PATENT DOCUMENTS

WO        2012116236    † 8/2012

OTHER PUBLICATIONS

Madhavapeddy A, Scott D, Sharp R. Context-aware computing with sound. InInternational Conference on Ubiquitous Computing Oct. 12, 2003 (pp. 315-332). Springer Berlin Heidelberg.*
(Continued)

*Primary Examiner* — Ranodhi Serrao
*Assistant Examiner* — James Fiorillo
(74) *Attorney, Agent, or Firm* — Grell & Watson Patent Attorneys LLC (57) ABSTRACT

A system for wirelessly transmitting and receiving customized data broadcasts comprising at least one computer apparatus running an application for customized data broadcasts. The computer apparatus uses the application to transmit and/or receive at least one broadcast. The system is further comprised of a server network infrastructure with: the application, at least one application server, at least one web server; and at least one database/information server. The infrastructure, servers, and application comprise a distributed computing environment in a secure server network model wherein the environment utilizes the application as a secure communicator of the broadcasts, thereby enabling secure communication of the broadcasts between any computer apparatus running the application. The application strengthens standard broadcast security by communicating the broadcast via the distributed computing environment in a secure server network model comprised of proprietary
(Continued)

software, a proprietary number of loops per broadcast transmission, and proprietary encoding and decoding protocols.

8 Claims, 6 Drawing Sheets (51) Int. Cl.
- *H04W 4/04* (2009.01)
- *H04W 4/06* (2009.01)
- *H04L 29/08* (2006.01)
- *H04H 20/61* (2008.01)
- *H04H 60/14* (2008.01)
- *H04N 21/2668* (2011.01)
- *H04H 20/16* (2008.01)
- *H04W 4/02* (2009.01)

(52) U.S. Cl.
CPC ...... *H04L 63/0807* (2013.01); *H04L 65/4076* (2013.01); *H04L 67/306* (2013.01); *H04W 4/04* (2013.01); *H04W 4/06* (2013.01); *H04H 20/16* (2013.01); *H04N 21/2668* (2013.01); *H04W 4/02* (2013.01)

(56) References Cited

U.S. PATENT DOCUMENTS

| | | | |
|---|---|---|---|
| 6,522,769 B1 | 2/2003 | Rhoads et al. | |
| 6,654,480 B2 | 11/2003 | Rhoads | |
| 6,728,753 B1* | 4/2004 | Parasnis | G06Q 10/109 709/203 |
| 6,737,957 B1 | 5/2004 | Petrovic et al. | |
| 6,757,730 B1* | 6/2004 | Lee | G06F 9/465 709/201 |
| 7,330,875 B1* | 2/2008 | Parasnis | G06Q 10/10 709/203 |
| 7,499,564 B2 | 3/2009 | Rhoads | |
| 7,562,392 B1 | 7/2009 | Rhoads | |
| 7,587,602 B2 | 9/2009 | Rhoads | |
| 8,634,796 B2* | 1/2014 | Johnson | H04W 4/02 455/404.1 |
| 8,867,313 B1* | 10/2014 | Rivlin | G01S 5/30 367/118 |
| 9,009,805 B1* | 4/2015 | Kirkby | G06K 9/00711 709/203 |
| 2004/0267646 A1* | 12/2004 | Chandhok | G06Q 20/145 705/34 |
| 2006/0251115 A1* | 11/2006 | Haque | H04B 7/2606 370/466 |
| 2006/0259957 A1* | 11/2006 | Tam | G06F 21/10 726/3 |
| 2006/0291506 A1* | 12/2006 | Cain | H04N 21/2547 370/486 |
| 2009/0102972 A1* | 4/2009 | Kurita | H04N 1/00137 348/554 |
| 2009/0201421 A1* | 8/2009 | Mawatari | H04N 5/765 348/553 |
| 2009/0298431 A1* | 12/2009 | Rasmussen | H04R 25/554 455/41.3 |
| 2010/0121849 A1† | 5/2010 | Goeldi | |
| 2011/0173249 A1* | 7/2011 | Lee | H04W 72/005 709/203 |
| 2011/0222621 A1* | 9/2011 | Christensen | H04B 5/00 375/271 |
| 2012/0171963 A1* | 7/2012 | Tsfaty | H04B 11/00 455/41.3 |
| 2012/0295560 A1* | 11/2012 | Mufti | H04B 13/00 455/95 |
| 2013/0268277 A1* | 10/2013 | Duplan | H04W 4/008 704/500 |
| 2013/0275305 A1* | 10/2013 | Duplan | G06Q 20/322 705/44 |
| 2013/0336497 A1* | 12/2013 | Duplan | H04R 3/00 381/77 |
| 2014/0140503 A1* | 5/2014 | Duplan | H04K 1/02 380/35 |
| 2014/0189135 A1* | 7/2014 | Lawson | H04L 63/0272 709/227 |
| 2014/0267079 A1* | 9/2014 | Duplan | G06F 3/04883 345/173 |
| 2014/0279101 A1* | 9/2014 | Duplan | G06Q 20/3224 705/18 |
| 2014/0282132 A1† | 9/2014 | Daly, IV | |
| 2014/0370879 A1* | 12/2014 | Redding | H04W 4/001 455/419 |

OTHER PUBLICATIONS

Lazic et al., Communication Over an Acoustic Channel Using Data Hiding Techniques, IEEE Transactions in Multimedia, Oct. 2006, pp. 918-924, vol. 8, No. 5.

Kaneto et al., Real-Time User Position Estimation in Indoor Environments Using Digital Watermarking for Audio Signals, 20th International Conference on Pattern Recognition (ICPR), Aug. 2010, pp. 23-26.

Nakashima et al., Indoor Positioning System Using Digital Audio Watermarking, IEICE Transactions in Information and Systems, Nov. 2011, vol. E94-D, No. 11.

Nakashima et al., Watermarked Movie Soundtrack Finds the Position of the Camcorder in a Theater, IEEE Transactions on Multimedia, Apr. 2009, pp. 443-454, vol. 11, No. 3.

Chen et al., Pushing Information Over Acoustic Channels, IEEE International Conference on Acoustics, Speech and Signal Processing, Apr. 2009, pp. 19-24.

\* cited by examiner
† cited by third party

FIGURE 6

SYSTEM AND METHOD FOR WIRELESSLY TRANSMITTING AND RECEIVING CUSTOMIZED DATA BROADCASTS

CROSS-REFERENCE TO RELATED APPLICATIONS

The present application claims priority to and the full benefit of U.S. Provisional Application No. 61/863,819, entitled "System and Method for Wireless Transmitting and Receiving Customized Digital Data Broadcasts," filed Jul. 8, 2013.

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

Technical Field of the Invention

The present disclosure relates generally to facilitating data broadcasts via a communication system.

Specifically, it provides a system and method for wirelessly transmitting and receiving customized data broadcasts (i.e. location information broadcasts) using sound waves or any other comparable data transport method (i.e. Bluetooth, etc.).

This method can be applied to send any data capable of being encoded, broadcast within a specific audible range or over a particular frequency via an acoustic data signal, but outside what any human (child or adult) or animal can hear or within Bluetooth or similar range, and then decoded when received (i.e. converts the acoustic signal back into an electrical event signal). However, it will be of greatest benefit to mobile computing technology.

Description of Related Art

Current developments in technology allow massive amounts of information to be shared constantly with varying audience groups. This information can come in many forms and can be as simple as an advertisement, to as complicated as application functionality. The information shared can serve hundreds of purposes, depending on the sending entity and the recipient audience. With the increase of technology, comes the human brain's natural tendency to begin filtering out sensory information. Therefore, the failure of information senders to smartly package and send information may cause said information to become ignored, lost or forgotten.

In order to smartly package information, engineers have begun experimenting with embedded data (data within data). The core purpose of packing information in this way is to embed additional data inside pre-existing data to enable sending both sets of data at the same time. Packaging data in this way minimizes the number of separate outputs, as well as the number of required 'receptors' for full information to be successfully delivered and received—and then subsequently consumed.

Similarly, in order to smartly send information, engineers have embraced alternate transportation technologies beyond physically-restricted signals (i.e. infra-red, etc.). The core purpose of smartly sending information is to consider the information to be sent and the audience to receive it and then determine a transportation method that will be effective. Given the voluminous amounts of information shared per second, alternate transportation methods have begun to consider non-disruptive modes, or in other words, a method to disseminate information that does not require the audience to actively detect it to still receive, utilize and interact with the information sent.

To stay abreast of the unique and changing needs and interests of both information broadcasters and respective audiences, broadcasters must wisely choose what data to package and/or send, and what transportation method to use to achieve maximum consumption upon delivery by the most appropriate audience members. Additionally, as technology advances and audiences desire more multi-media content more quickly, broadcasters must consider the limitations of their chosen packaging method (a.k.a. embedding, compression type, etc.) and transport methods. Prior art patents and other publications offer several attempts to meet these challenges.

For example, the Levy, et al. patent having U.S. Pat. No. 6,505,160, filed May 2, 2000, and entitled, "Connected Audio and Other Media Objects", discloses a technology similar in a plurality of data embedding methods, where engineers design ways to embed fingerprints, watermarks, or other similar types of data within common transportation methods like audio signals—thereby sending data like URLs, artist information, production details, etc. simultaneous with the audio data. As a result, senders and receivers must plan the encoding and decoding technology for the metadata in addition to the technology for the primary data (audio signal, etc.). This approach is inefficient and costly due to protracted back-and-forth updating, excessive user-context information requirements, and active communication between senders and receivers.

Other systems attempt to reduce the inefficiencies present in Levy and common in the industry. For example, the Rhoads, et al. patent, having U.S. Pat. No. 8,180,844, filed Mar. 18, 2000, and entitled, "System for Linking from Objects to Remote Sources" uses machine readable code (e.g. digital watermark or bar code) gained from a physical or electronic object to link to further information. The process of object linking in this way reduces the processing overhead Levy suffers from, but requires additional action on the recipient's part. By introducing additional action, as opposed to less action, to receive and consume further information, systems using technologies like those found in Rhoads do not solve the transport or the consumption efficiency sought to overcome sensory filtration or otherwise ineffective delivery. Furthermore, while Rhoads' technology reduces processing overhead, it further narrows possible recipient devices and thereby narrows its default recipient audience.

Some prior art systems take attempts at improving efficiency a step further. For example, the Jones, et al. patent, having U.S. Pat. No. 7,796,978, filed Nov. 30, 2001, and entitled, "Communication System for Receiving and Transmitting Data Using an Acoustic Data Channel" uses spread spectrum technology to embed data inside an acoustic signal, as opposed to creating a digital watermark or fingerprint. The receiving device decodes the embedded data and interprets it. Jones' disclosure further reduces the inefficiencies present in Levy's technology, but limits itself to fewer than 5 kHz. In addition, because Jones is using spread spectrum, the data itself is spread throughout the acoustic signal to reduce power requirements for transmission, thereby hindering larger, more complicated transmissions and possible looping.

Another prior art system, the Petrovic, et al. patent, having U.S. Pat. No. 6,737,957, filed Feb. 16, 2000, and entitled, "Remote Control Signaling Using Audio Watermarks" uses an embedded watermark in an audio signal to control a remote device (i.e. a stuffed animal). Similar to Jones' technology, Petrovic is also using spread spectrum but has added a "time gate" function, whereby a small time interval is opened allowing a user to perform an action. Once the time interval closes, the action is no longer processed. While Petrovic discusses resynchronization for signatures, it does not consider the security of signature verification introduced in the present disclosure. Nor does Petrovic include a method to allow larger amounts of data to be exchanged via the watermarking process. Petrovic is limited to small amounts of data and signature activation (as opposed to verification) for a window of time. Petrovic narrows the possible uses of embedding data in an audio signal, similarly creating inefficiencies the present disclosure seeks to avoid.

Other prior systems also describe methods of capturing or otherwise recording incoming audio or audio visual data, then running the captured sections through a digital filter to strip out potential information. Unfortunately, current technology requires a tremendous amount of maintenance and planning, along with additional, coupled technologies and user-specific context to deliver packaged information. And often, this delivery neither uses the most efficient transport mode, nor minimizes intrusion or sensory filtration concerns with intended audiences. One skilled in the art would recognize these processes and short-coming as tedious, time-consuming and unnecessarily limiting to the available capabilities of the base technologies.

The above mentioned solutions, as well as others, are narrowly focused and inadequate for providing an efficient and effective means for creating, encoding, broadcasting, decoding and utilizing received data in today's technological world. Furthermore, the security of such data and the ability to confirm it is successfully received without inefficient overhead is a growing concern. Without adequate attention to current technologies already in use sending data, new broadcasters run the additional risk of inconsistent or unreliable data delivery. Therefore, it is readily apparent that there is a need for a system and method that allows for effective, simplified creation, distribution, and receipt of customized data broadcasts.

BRIEF SUMMARY OF THE INVENTION

Briefly described, in select embodiments, the present disclosure overcomes the above-mentioned disadvantages and meets the recognized need for such varied, unique and expedient information delivery by providing a system and method for wirelessly transmitting and receiving customized data broadcasts.

In select preferred embodiments, varied, unique and expedient information delivery is achieved via effective, simplified creation, distribution, and receipt of customized data broadcasts using a novel system and method capable of adding unique, additional functionality to existing mobile computing technology.

The present system and method can simplify the transmission of data to applicable audiences without requiring extensive configuration, reserved bandwidth or data channels, or additional hardware or transport technologies outside those already readily available in mobile computing technology. The system can allow a broadcaster to use a secure, network-based application to create a private sub-network (i.e. peer to peer), connect users to that private sub-network, and then use the private sub-network to provide efficient transmission of customized data broadcasts (in one application, location information broadcasts—but the broadcast can be just about anything). In other words, the data to be transmitted can be encoded in a token-type package (i.e. data instruction). The transmitting device can embed a unique signature that it broadcasts within a "carrier signal," which can be a variety of other types of audio signals, and the entire audio "package" is outputted by a speaker of some sort (i.e. electro-acoustic transducer). The listening device may then "hear" the unique signature, authenticate the signature with the server, and request the "token." The listening device can then analyze the token and may be able to recover the embedded data to execute the instruction.

A device running the customized application may be able to contact a server in the secure network (i.e. cloud), provide its unique signature to authenticate to the server in the cloud, and then receive the customized data broadcast it is listening for in the form of a token. The server in the cloud can send back this token to the device with the customized application requesting it to enable the customized application to decode the token and execute whatever command is embedded in the event signal (i.e. data package). Other devices within the same listening range can perform the same functions and, likewise, can also interact with each other via tokens—enabling the devices with authenticated unique signature to function very similarly to a peer-to-peer network.

Similarly, the system can allow any computing device that is capable of running said customized application to likewise create and broadcast customized broadcasts using said customized application via an interface provided by a web browser. Within the customized application, the system can allow a broadcaster to define a customized broadcast that is then uniquely encoded, saved to the server in the cloud, and then sent to an audience when requested. Whereby all communication between devices may now occur via the server, where the communication may be privately among those devices that have been authenticated to the "peer-to-peer" network.

A device running the customized application may be able to listen for the customized broadcast, filter out other existing broadcasts from other broadcasters, verify the validity of said received customized broadcast, and subsequently decode it. The system can perform the above activities passively, without requiring any user interaction beyond the 'joining' of the peer-to-peer network via token exchanged (discussed above), and then may execute the decoded data embedded in the signal on the receiving device. The ability for these activities to be bi-directional in sending and receiving makes the present disclosure highly flexible and technologically superior.

The customized data broadcasts themselves can be embedded in existing, digital audio signals like MP3s, radio or television broadcasts (digital or analog) or can be sent in a signal within the audible range but not readily audible by humans (but transmittable and detectable with a standard microphone and speaker). Additionally, the broadcasts can be sent via a similar transport method, appropriate for the current application (i.e. Bluetooth, etc.). Furthermore, the customized data broadcasts can have markers that make the broadcast a unique data package and may have a method of looping the broadcast that will be similarly unique, which may enable the sending/receiving application to identify the broadcast as one it should 'listen' to and verify, by listening for repeating loops, that it has received the full broadcast and the broadcast is eligible for authentication and request from the server, and then subsequent decoding once received.

In select embodiments, the system may comprise a secure network connection with at least one computer apparatus and at least one server, which comprises at least one application server, at least one database/information server, at least one web server, at least one computer apparatus running the customized application received from the application server via the web server that the computer apparatus has stored in non-transitory computer readable medium and is using the customized application to access data on the database/information server, at least one web-browser by which a broadcaster can create, modify, and/or send broadcasts, and at least one broadcast. Broadcasters can directly and independently interact with broadcasts using a computer apparatus over a remote secure network connection (i.e. cloud) or alternatively can receive broadcasts without any required interaction (as discussed above).

Generally speaking, the computer apparatus can be any device that is capable of connecting to a network, wired or wireless, and may include a standard microphone and/or standard speaker. In select embodiments, the computer apparatus may be capable of communicating on a cellular network if it does not have network connectivity otherwise.

Also, in some embodiments, the computer apparatus may be capable of data processing to the extent it can access secured networks, offer web-browsing capability, install and run the application. However additional data processing may be unnecessary since the associated data (broadcasts) are not stored permanently on the computer apparatus. Instead, the application may either be used to receive, in real-time, a broadcast and decode it, then execute the associated command or, create or modify a broadcast that may be stored on the information server via a secured remote network (i.e. cloud) and broadcast from the application to other computer apparatuses that may have the application installed to receive the broadcast(s).

For creating or modifying broadcasts, a user may only need to have credentials to access the remote secured system via the computer apparatus. The application may act as an interface for a broadcaster or a passive receiver to create, modify and send broadcasts, or receive, decode and execute broadcasts.

In the current embodiment, the technology can be used for internal navigation when coupled with a pedometer and compass application where satellite access and traditional GPS functionality is unavailable or otherwise inapplicable. Internal navigation can be achieved using mobile computing devices that act as beacons or pre-programmed low-energy, self-powered chip sets that may be placed inconspicuously in strategic locations in a venue.

Regardless of which type of beacon is used, the beacon may be accessible via the customized application and configured to broadcast customized data broadcasts. These customized data broadcasts can be broadcasted in a loop in a specified range of frequencies (i.e. 18-22 KHz) to those devices within near-field communications range, listening for said broadcasts. Once the listening devices hear the beacons' broadcasts, they may use the peer-to-peer network to contact the server to receive the token of the broadcast heard to decode it. The server may have a database of programmed locations based on venue it can return in response to the decoding request. Once decoded, the broadcast may reveal location information that may relate to pre-programmed locations at the venue (i.e. "You are Here").

Due to strategic beacon (or other transmitting device) placement, the customized application can be capable of hearing multiple broadcasts from multiple beacons to measure the strength of signal from any one beacon enabling distance to be determined by and amongst the various beacon broadcasts. The customized applications' ability to measure signal strength in this way may avoid the need for triangulation to determine actual location and enable movement to be registered and location re-determined. As a user gets farther away from the most recently 'heard' beacon, it may pick up the next beacon and the system may essentially resynchronize itself to adjust the position. This may assist in accuracy and efficiency by reducing overhead required by triangulation.

In addition to indoor navigation, another application of the present disclosure may be threshold security (i.e. locked doors, security checkpoints, computer login screens, etc.). A threshold security apparatus capable of granting entrance (i.e. unlocking a door) may be listening for a broadcast from a beacon. In this application, a computer apparatus may serve as a beacon transmitting a broadcast to the threshold listening device. This unique audio beacon may be retrieved via a secure application from a server in the cloud and is valid only for a limited amount of time. The beacon may transmit its broadcast to the threshold listening device (gatekeeper) and the threshold listening device may check with the secure, centralized server to verify validity of the broadcast (i.e. valid, not expired, etc.). If the broadcast passes validation, the threshold listening device may then grant access to the user of the computer apparatus (i.e. unlock, open, allow access, etc.).

Also, this threshold security apparatus can resolve the problem of multiple login IDs and passwords that users must remember for a variety of services they use. In this application, a first computer apparatus can run one instance of the customized application which then provides access to a list of secured website (or threshold) choices with a single login and password. Once the user of the computer apparatus logs into the customized application on the first computer apparatus which is authenticated and validated via a server in the cloud, the user is then presented with a list of the websites, physical thresholds, etc. requiring access. On a second computer apparatus, the user can launch a browser to initiate a second instance of the customized application containing the threshold listening plug-in (which enables a computer apparatus to be a threshold listening device). Once the second computer apparatus is configured to be a threshold listening device, the user can return to the first computer apparatus and select the website or threshold for desired access. The first computer apparatus contacts the server in the cloud to retrieve the broadcast necessary for the access selected, and once received, transmits the broadcast (acting as a beacon) for the second computer apparatus to hear. The second computer apparatus verifies the validity of the broadcast when it hears it via the server in the cloud and grants access to the user to the selected website or threshold—without any additional login or password requirements.

As an added security feature in said threshold security apparatus application, the first computer apparatus running the first instance of the customized application configured to act as a beacon that transmits the broadcast has become the computer apparatus required to grant access for single login. In the event the security of either computer apparatus is ever compromised, the customized application can be disabled and its user ID and password invalidated by accessing the customized application via the cloud. Also, because the broadcast being transmitted is intended to be temporarily valid, any secondary capturing of said transmission would be incapable of reuse by any other user because the broadcast may have been designed with restrictions further securing it (i.e. temporal, limited use, etc.). Said broadcast restrictions may also be configured to loop within certain parameters and if the user of a computer apparatus goes outside of listening or broadcasting range (or the computer apparatus is otherwise compromised) the threshold listening device can automatically log said user out or otherwise block continued access.

The present disclosure and alternate embodiments demonstrates significant advantages over prior art. One feature and advantage may be increased efficiency of secure, information dissemination by using unique encoding (data packaging) and looping. Effectively, any computer apparatus running the application may become a sophisticated transmitter and receiver for customized data broadcasts—in this instance, location broadcasts.

Another feature and advantage may be a uniform and friendly user interface. The application can be easily accessed through the remote secured network (i.e. cloud) and installed on the computer apparatus (i.e. via app or play store on a smart phone). Using the application, broadcasters can easily create broadcasts to send, and receivers can be assured they will receive the broadcasts without requiring any special technical knowledge or configuration, or active participation to receive. Further, novel encoding and looping methods may ensure uniformity and security among all users of the technology even when third party broadcasters are also sending broadcasts, thereby facilitating targeted broadcast delivery.

A further feature and advantage may be the disclosed system and method's ability to function effectively using devices that require very little energy. In a first embodiment, sound waves can be used within an audible range but outside human or animal hearing. Sound 'beacons' can be extremely inexpensive and this embodiment may enable use of the existing microphone and speaker on the computer apparatus. Other lower energy technologies may also be substituted for audio signals, such as Bluetooth LE or similar transport technologies without modifying the functionality or efficiency of the disclosed system and method.

BRIEF DESCRIPTION OF THE SEVERAL VIEWS OF THE DRAWINGS

The present disclosure will be better understood by reading the Detailed Description of the Preferred and Selected Alternate Embodiments of the disclosure with reference to the accompanying drawing figures, in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of the construction shown, except insofar as they may be deemed essential to the claimed disclosure.

DETAILED DESCRIPTION

In describing the exemplary embodiments of the present disclosure, as illustrated in FIGS. 1-6, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to FIGS. 1-6, by way of example, and not limitation, there is illustrated an example embodiment of system 100 for wireless transmitting and receiving customized data broadcasts, wherein system 100 comprises computer apparatus 109 that may be using the application accessed and installed from the application server 115, to access the web server 113 to gain access to the information server 114, via a secure communication network connection 116, that may travel through the public data network (Internet) 111 and then through to the secure data network 112 (i.e. cloud) to create or modify and then transmit 110 a customized data broadcast 107. The customized data broadcast 107 may be transmitted via the transmitting computer apparatus' 109 standard speaker 108.

Figure 1:
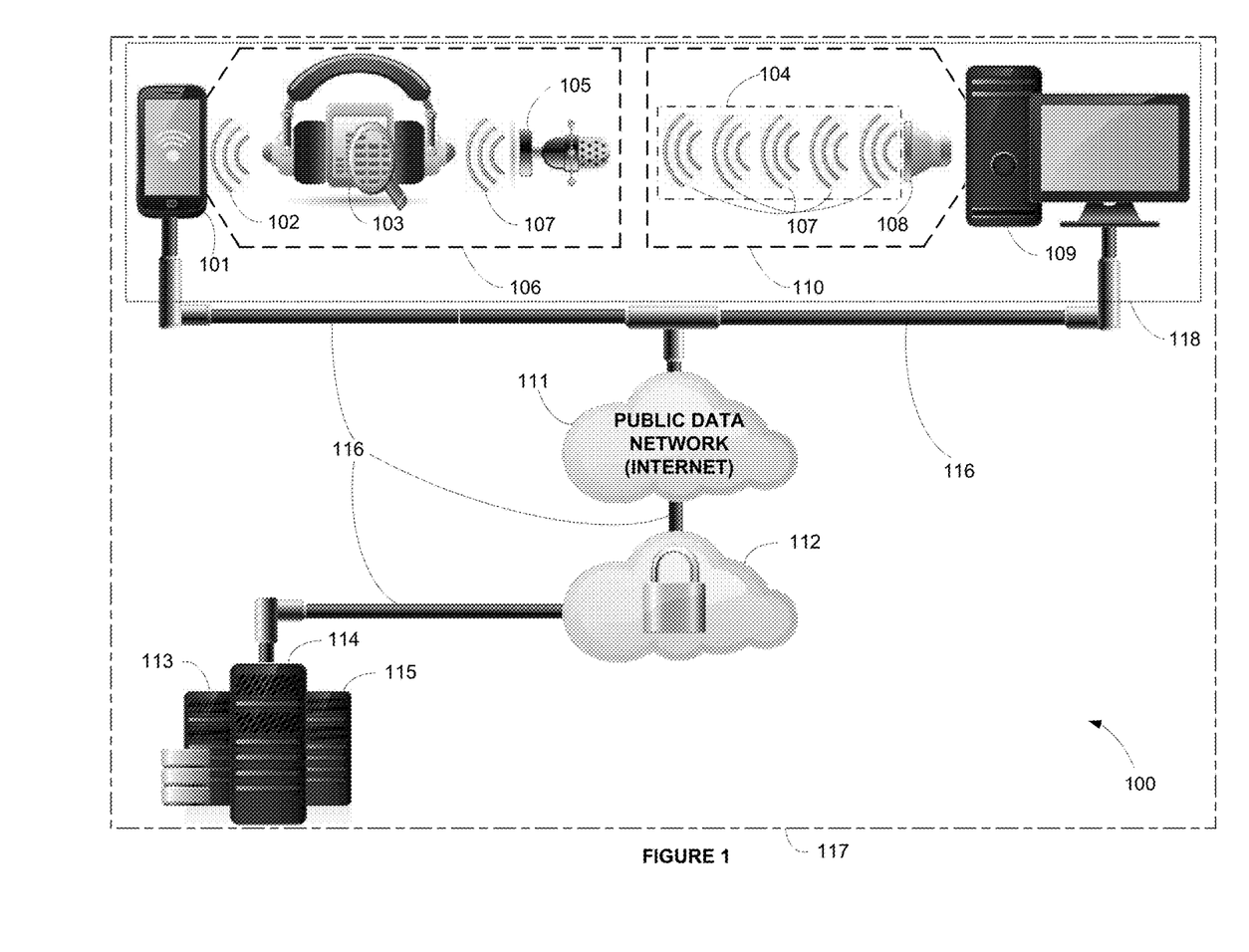
FIG. 1 is a schematic overview according to one embodiment showing the system and a single broadcast transmission and receipt.

Here, the customized data broadcast 107 may be uniquely looped 104 as it is transmitted. The receiving computer apparatus 101, running the application it accessed and installed from the application server 115, may use its standard microphone 105 to 'listen' 106 for the customized data broadcast 107. When the application running on the receiving computer apparatus 101 hears the customized data broadcast 107 it may analyze it to 'strip' the data from the signal 103. Once the data is distinguished and decoded 102, the command can now be executed on the computer apparatus 101 (best shown in FIG. 6).

It will be recognized by those skilled in the art that distributed computing environment 117 may be a LAN, WAN, VPN, the like, combinations thereof, or any network configuration of electronic devices. It will further be recognized that application servers 115 and database/information servers 114 may function on separate computers (best shown in FIGS. 1 and 2), or alternatively may function on the same computer (not shown). It will further be recognized that in an alternate embodiment 200 (best shown in FIG. 2), transmitting computer apparatus 101 and receiving computer apparatus 109 may comprise smart phones, desktop computers, tablets, etc., the like, or any combination thereof.

Figure 2:
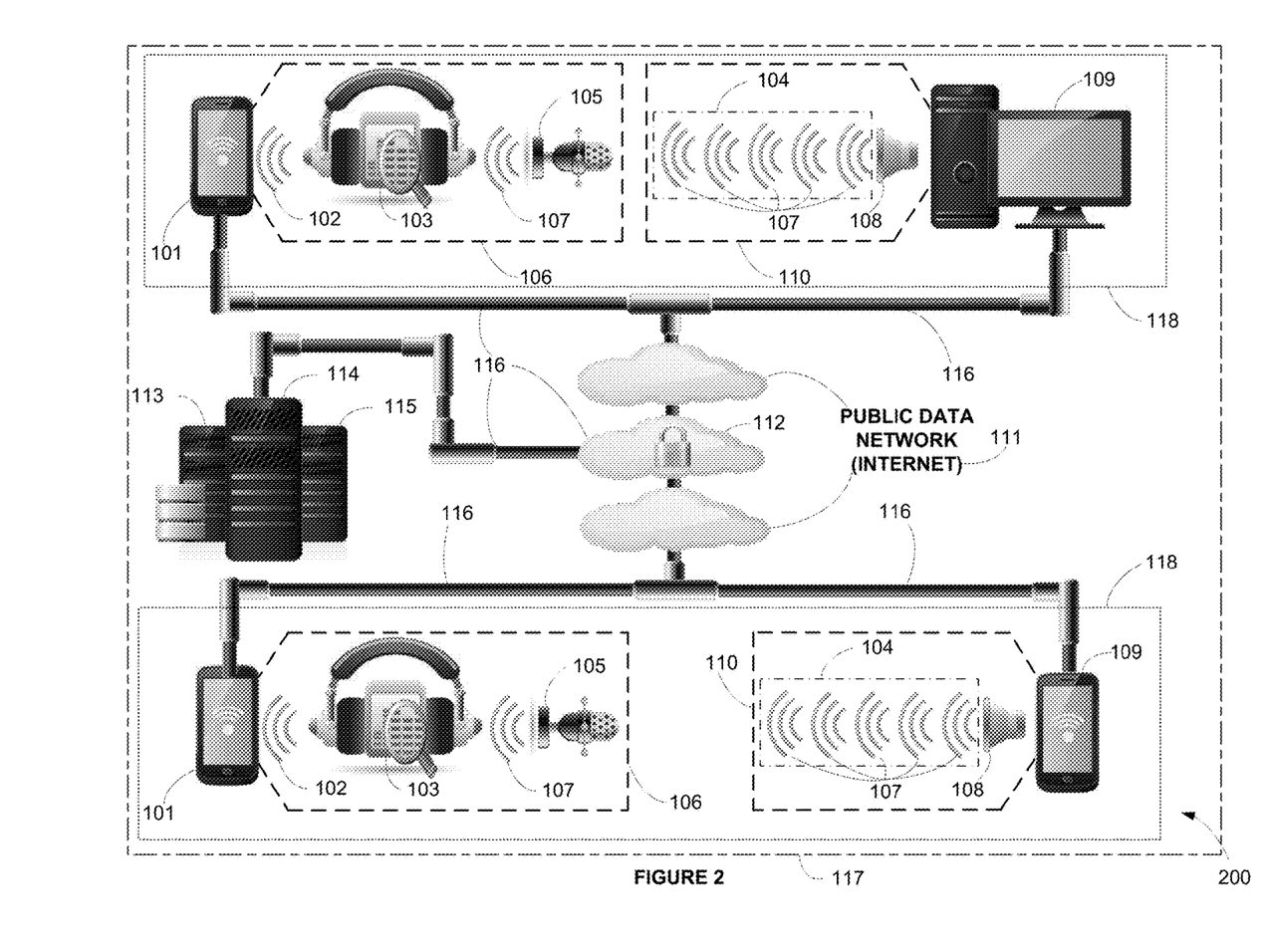
FIG. 2 is a schematic overview according to another embodiment further showing the system and multiple broadcasts and receipts.

Referring now to FIG. 2, system 200 further depicts an alternate embodiment with multiple broadcasting sessions occurring at the same time within the distributed computing environment 117.

Similar to FIG. 1, system 200 comprises computer apparatuses 109 that may both be using an instance of the application accessed and installed from the application server 115, to simultaneously access the web server 113 to gain access to the information server 114, via a secure communication network connection 116, that may travel through the public data network (Internet) 111 and then through to the secure data network 112 (i.e. cloud) to create or modify and then transmit 110 customized data broadcasts 107. The customized data broadcasts 107 may be transmitted via the transmitting computer apparatuses' 109 standard speakers 108.

Likewise, the customized data broadcasts 107 may be uniquely looped 104 as they are transmitted. The receiving computer apparatuses 101, running their separate instances of the application they accessed and installed from the application server 115, may use their standard microphones 105 to 'listen' 106 for the customized data broadcasts 107. When the applications running on the receiving computer apparatuses 101 hear the customized data broadcasts 107 they may analyze them to 'strip' the data from the signals 103. Once the data are distinguished and decoded 102, the commands can now be executed on the respective computer apparatuses 101 (best shown in FIG. 6). Specifically, FIG. 2 highlights the flexible and highly scalable nature of the present disclosure reducing resource limitations while increasing computer apparatus connectivity and therefore multiplying broadcasting and receiving abilities exponentially.

Figure 3:
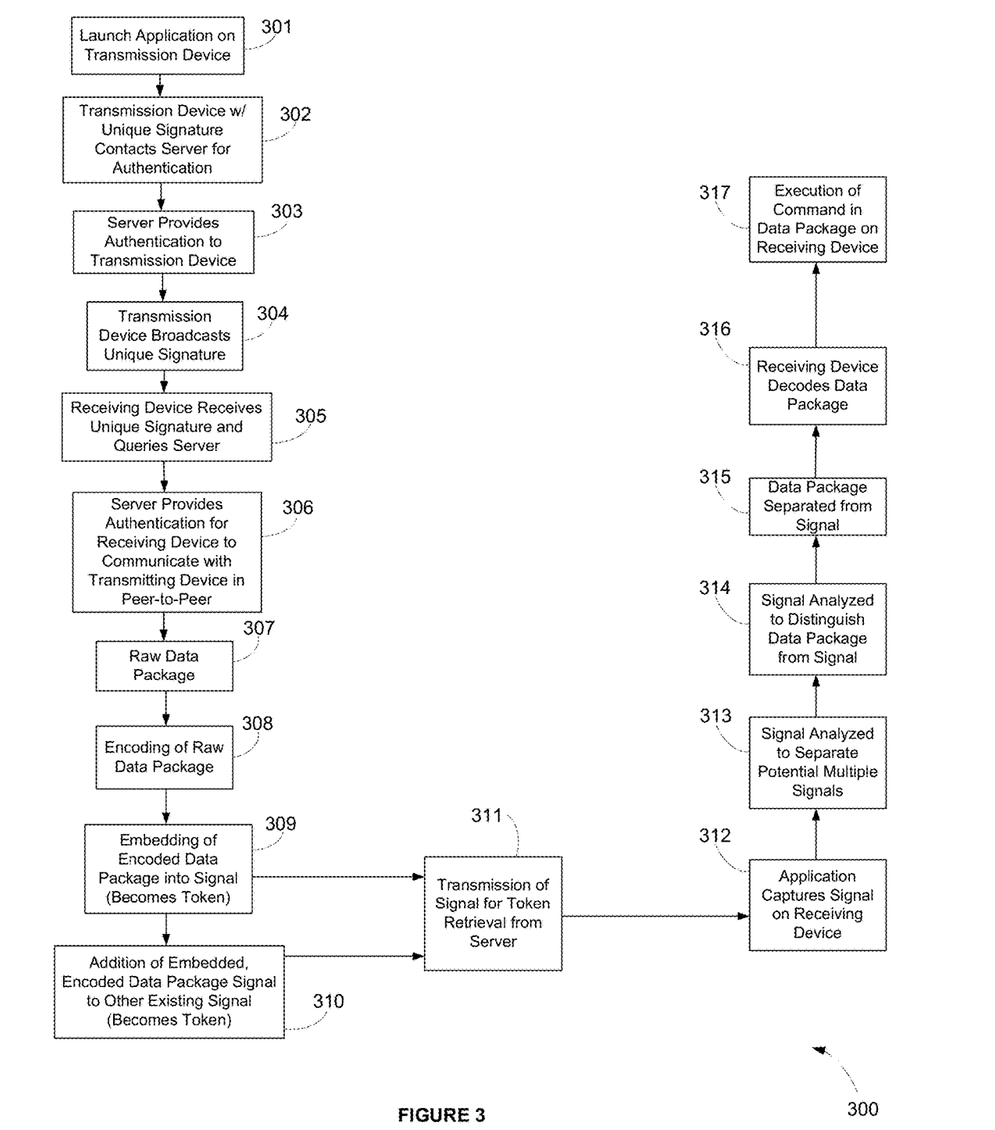
FIG. 3 is a flow chart depicting one exemplary embodiment of encoding that can be used to create a custom data package, send it, and then decode it, using the system as referenced in FIGS. 1 and 2.

Turning now to FIG. 3, in one embodiment, the relationship between the broadcasting system (100 or 200) and the method by which broadcasts 107 are created and transmitted 110 or received 106 is shown as system 300. The exemplary flow chart is a simple diagram of the packaging process for embedding the encoded data packet into a signal, broadcasting it, receiving it and then decoding it for command execution. At step 301, the application may be launched on the transmission device 101 that has a unique signature. The transmission device 109 may then contact the database/information server 114 via the secure communication network connection 116 for authentication at step 302. The database/information server 114 may provide authentication to the transmission device 109 at step 304 and the transmission device 109 then can broadcast its unique signature. The receiving device 101 may receive the unique signature of the from the transmission device 109 at step 305 and queries the database/information server 114 for authentication. At step 306, the database/information server 114 may provide said authentication to the receiving device 101, which may allow the transmitting device 109 and the receiving device 101 to communicate in a secure sub-network (i.e. peer to peer).

Figure 6:
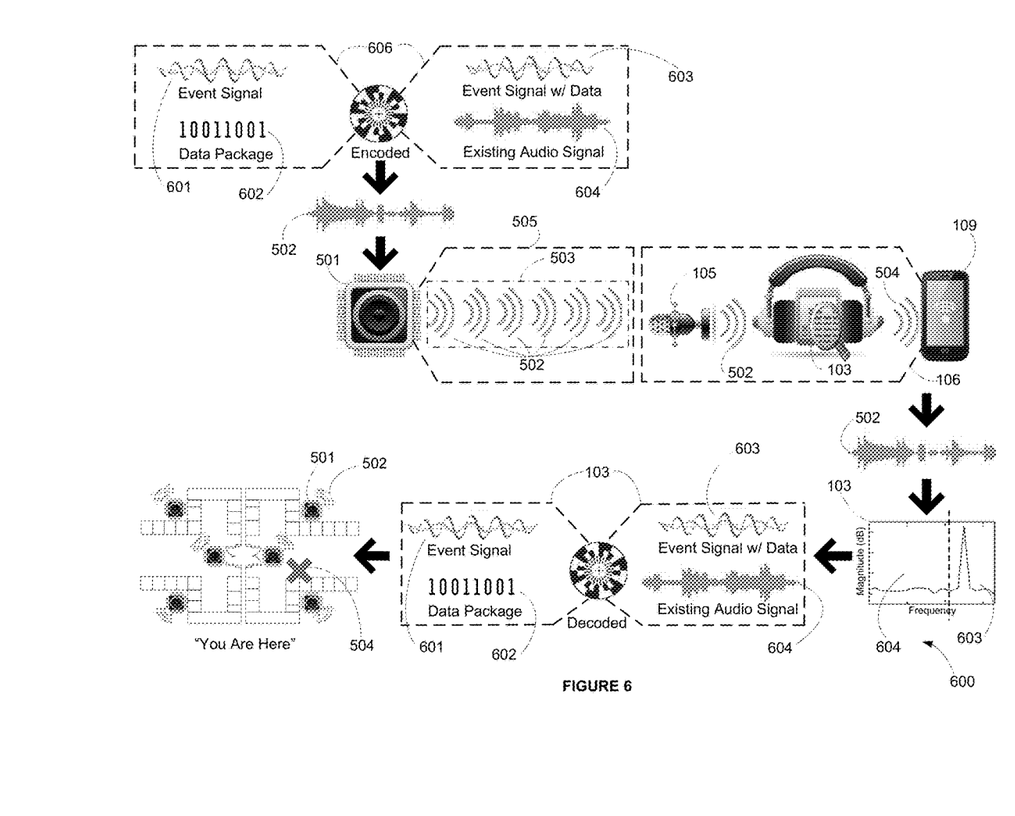
FIG. 6 is a further schematic overview according to another embodiment showing the makeup of a broadcast transmission.

The raw data package at step 307 may be encoded at step 308 (best shown in FIG. 6). The encoded raw data package can then be embedded into an 'event' signal at step 304. At step 309, this event signal with the embedded, encoded data package can either be transmitted as is, via step 311, or it can be added to an additional signal (i.e. existing audio, TV or radio broadcast, etc.) at step 310 in preparation for transmission at step 311. At either step, regardless of how the signal is embedded, the signal package itself may be stored on the database/information server 114, and when transmitting devices 109 or receiving devices 101 query the database/information server 114 for authentication, upon authentication, the signal package may be provided by the database/information server 114 in the form of a token.

At step 312 the receiving device 101 running the application may capture the customized data broadcast token 107 transmission. At step 313 the customized data broadcast token 107 can be analyzed for the presence of multiple signals (a.k.a. an event signal plus existing signal or just event signal). The event signal, when located, may be further analyzed at step 314 to distinguish the data package from the event signal—the data package may then be separated from the signal 315. Finally, the receiving device 101 can then decode the separated data package at step 316 to execute the included command at step 317.

It will be recognized by those skilled in the art that various technologies can be used for the modulation equally as effectively and that the combined signals, as referenced in a possible step 309 or 310 can be reconstructed using a variety of equally effective technologies. The variance in either of the above technologies for the disclosed steps will have no appreciable impact on the overall disclosure and thus the present disclosure is not intended to imply, directly or indirectly by the order of steps or any terminology used herein that any single technology is better than another. Inherent in this system and methodology is the fact that well-know modulation and demodulation technologies in the industry can be interchangeable, and can differ substantially while still achieving the same unique results, depending on the system into which they are integrated.

Figure 4:
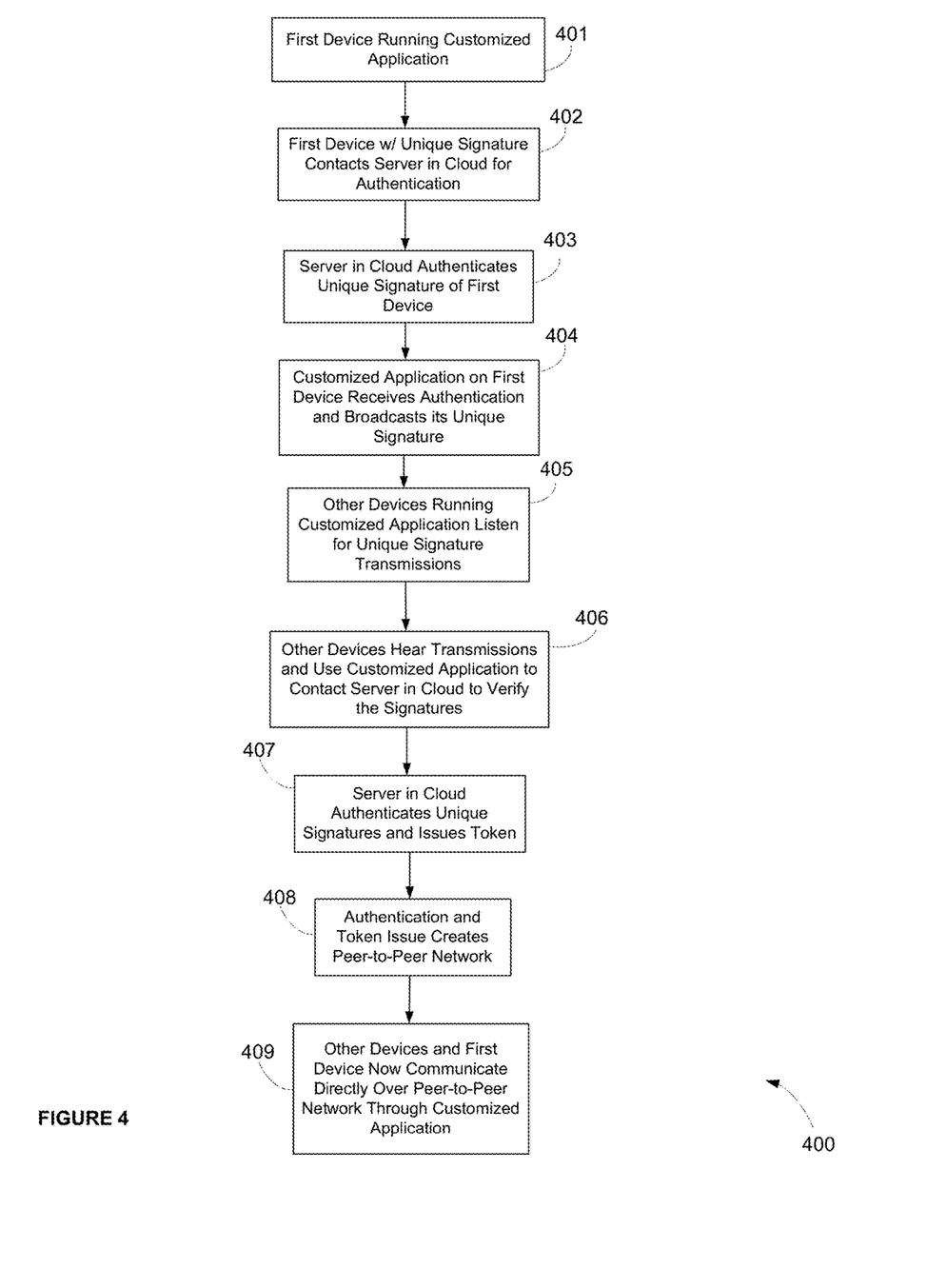
FIG. 4 is a flow chart depicting one exemplary embodiment of the creation of the private, sub-network (peer-to-peer) over which customized broadcasts will be sent, as referenced in FIGS. 1 and 2.

Turning more particularly now to FIG. 4, in one embodiment, the method by which broadcasts 107 are created and transmitted 110 or received 106 is shown in more detail as system 400. At step 401, the first device may be running the customized application (transmitting device 109 or receiving device 101, or some variation thereof 501). At step 402, this first device with its unique signature may contact the server in the cloud for authentication. At step 403, the server in the cloud may provide said authentication and then broadcast its unique signature to other devices via step 404. The other devices listening for broadcasts at step 405 may pick up the broadcasted signatures in step 406 and query the server for authentication. The server in the cloud authenticates the signatures at step 407 and issues the requested customized broadcast transmission token. Once this token is issued, a secure, sub-network (i.e. peer-to-peer) may be essentially created at step 408, allowing the devices to securely communicate directly with each other at step 409.

Figure 5:
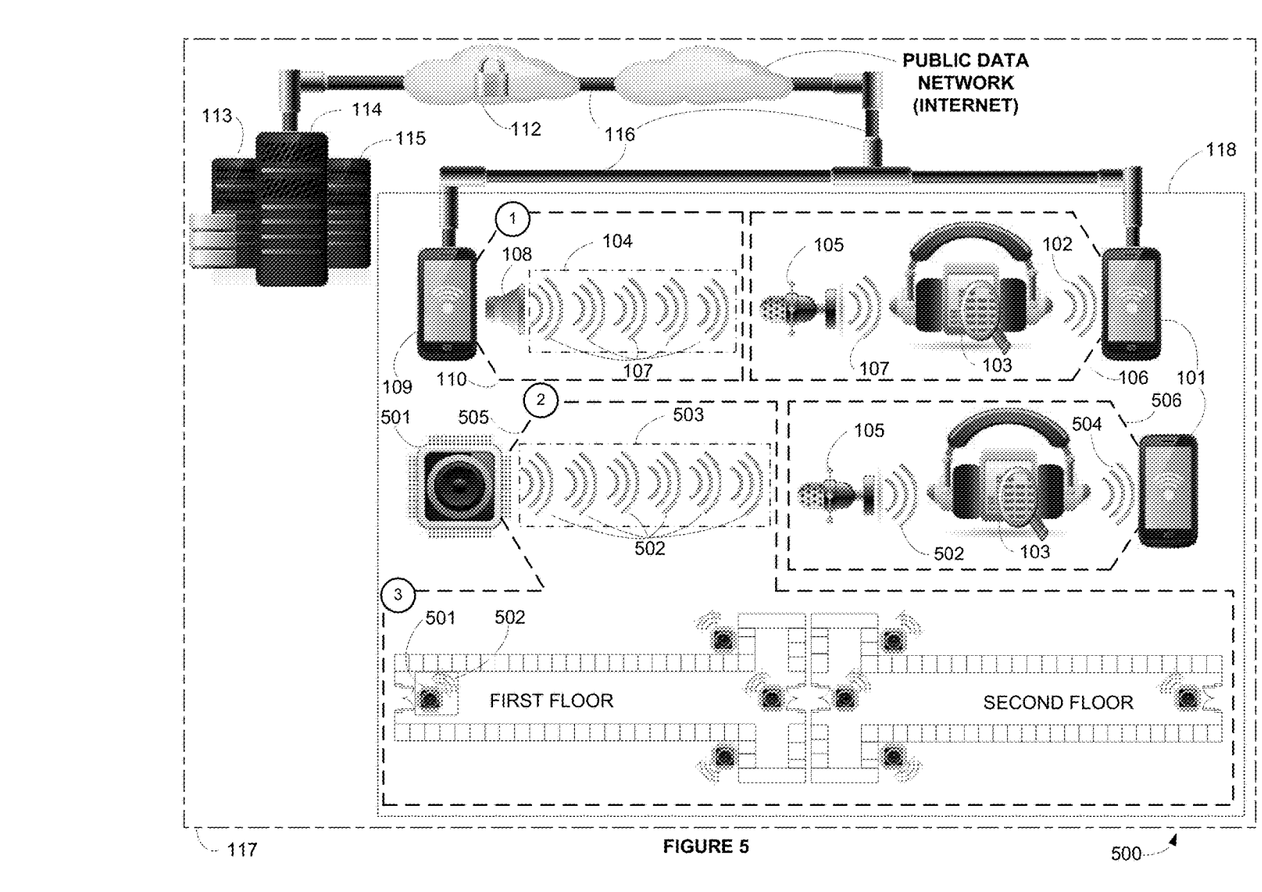
FIG. 5 is a schematic overview according to another embodiment showing the system, a single broadcast transmission, origination of the broadcast transmission, and an expanded view further showing broadcast origination.

By way of further detail, FIG. 5 breaks down the broadcast transmission shown in FIGS. 1 and 2 in system 500. Here, in an exemplary embodiment, the transmitting device 109 and associated transmission process (Step 1) can be actually using a beacon 501 (Step 2) that has been programmed to emit a customized location broadcast 502 in a proprietary loop 503. The receiving device 101 may follow the identical steps disclosed in the other figures to 'listen for,' authenticate and decode the data within the broadcast 502. In this case, at Step 3, the data may be a location broadcast that reveals embedded data for a location stored on the database/information server 114 relative to a map accessed via the server in the cloud. The 'execution' of this embedded location data may be identification, as shown in FIG. 6 of 'You are Here' 504.

Finally, moving to FIG. 6, a further detailed schematic of the makeup of an exemplary transmission is laid out as system 600. The transmission 502 may be comprised of an event signal 601 and a data package 602. These two can get 'encoded' or packaged into an event signal with data 603 for embedding into an existing audio signal 604 (optional). The resulting data package (token) 502 may then be stored on the database/information server 114 in the cloud and may be what the beacon 501/transmitting device 109 is sending a signature out for via 505. The receiving device 101 may hear the signature, contact the server in the cloud for authentication of the signature and receipt of the associated token 502.

The receiving device 109 may then use the customized application to decode the token's contents 103. The decoding process may first require the event signal with the data 603 to be identified in the data package 502 and separated/differentiated from the existing audio signal 604. The event signal with the data can then be decided to isolate the event signal 601 and the data package 602. Once the data package 602 is isolated, the command within it (here, "You are Here" 504) can be executed.

The foregoing description and drawings comprise illustrative embodiments of the present disclosure. Having thus described exemplary embodiments of the present disclosure, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method or the implied well-known industry technologies.

Many modifications and other embodiments of the disclosure will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herewith, but is limited only by the following claims.

What is claimed is:

1. A system for wireless transmitting and receiving customized data broadcasts comprising:
   at least one first computer apparatus having a display, a speaker, a microphone, and a network connection;
   at least one second computer apparatus having a display, a speaker, a microphone, and a network connection;
   a public data network;
   a secure data network;
   an application server;
   an information server;
   a Webserver;
   wherein said first computer apparatus is configured to run an application accessed and installed from said application server to authenticate said first computer apparatus, and said first computer apparatus is further configured to broadcast a customized data broadcast, access said Webserver over said public data network, and access said information server via said Webserver and said secure data network;
   wherein said second computer apparatus is configured to run an application accessed and installed from said application server to authenticate said second computer apparatus, and said second computer apparatus is configured to receive a customized data broadcast, access said Webserver over said public data network, and access said information server via said Webserver and said secure data network;
   wherein said first computer apparatus and said second computer apparatus communicate on a secure subnetwork between said speaker and said microphone;
   wherein said second computer apparatus is within a broadcast range of a plurality of said first computer apparatus, thereby enabling said application to calculate a relative location of said second computer apparatus based on a strength of an audio signal measured by said application said communication between one of said plurality of first computer apparatus and said second computer apparatus;
   wherein said customized data broadcast comprising at least location data, stored on said information server is embedded in said audio signal; and
   wherein said first computer apparatus and second computer apparatus are capable of bi-directional communication utilizing said audio signal.

2. The system of claim 1, wherein the first computer apparatus encodes said customized data broadcast prior to broadcasting.

3. The system of claim 2, wherein the second computer apparatus decodes said customized data broadcast upon receiving said customized data broadcast.

4. The system of claim 3, wherein said location data enables said second computer apparatus to access a map from said information server via the secure data network.

5. The system of claim 4, wherein said application running on said second computer apparatus displays said second computer apparatus's location on said map.

6. The system of claim 3, wherein said customized data broadcast further comprises a data command, and wherein said data command is executed on said first computer apparatus to authenticate access.

7. The system of claim 1, wherein said customized data broadcast comprises a unique identifier of said first computer apparatus.

8. The system of claim 1, wherein said second computer apparatus also operates as a first computer apparatus.

* * * * *